United States Patent Office 3,535,372
Patented Oct. 20, 1970

3,535,372
PREPARATION OF ESTERS FROM ALKANES
Herman L. Finkbeiner, Ballston, and John B. Bush, Jr., Schenectady, N.Y., assignors to General Electric Company, a corporation of New York
No Drawing. Filed July 5, 1968, Ser. No. 742,483
Int. Cl. C07c 67/00
U.S. Cl. 260—488                 8 Claims

ABSTRACT OF THE DISCLOSURE

Acetate and propionate esters are prepared by oxidatively coupling an alkane having at least three carbon atoms, at least one of said carbon atoms having at least one, but not more than two hydrogens with acetic acid or propionic acid using an active manganic salt of at least one of said acids as the coupling agent.

---

The invention relates to a process of making esters directly from an alkane. More specifically, this invention relates to a process of making acetate or propionate esters by oxidatively coupling an alkane having at least three carbon atoms, at least one of said carbon atoms having at least one, but not more than two hydrogens, with acetic acid, propionic acid or a mixture thereof using an active manganic salt of at least one of said acids as the oxidative coupling agent. The alkane may be either cyclic, straight chain, or branched chain.

Esters, as a group of chemical compounds, have many useful and interesting properties. They are generally liquids, or if solids have very low melting points. They are characterized by a pleasant odor, which accounts for their use in the perfume industry. They also are good solvents for a wide variety of chemical compounds and, as such, find wide use in industry.

The general method for making esters is by esterification of an alcohol with a carboxylic acid using an acid catalyst. This method of course, depends upon a source of the desired alcohol which, except for the lowest members of the alkanol series, are not readily available. With the development of the petroleum industry, the preparation of alcohols by oxidation of hydrocarbons did make available a wider variety of alcohols for the making of esters. However, this involves two steps for making the esters, the oxidation of the hydrocarbon to the alcohol followed by esterification of the alcohol with the carboxylic acid to produce the ester.

Kooyman and his students, in studying various reactions of manganic acetate in glacial acetic acid, found that benzene, chlorobenzene or toluene are converted to the corresponding phenylacetic acids which further react to form benzyl acetates, benzylidene diacetate and benzaldehyde. In the case of toluene, benzylacetate was also produced but not as the main product. We have now unexpectedly found that alkanes having at least three carbon atoms, at least one of said carbon atoms having at least one, but no more than two hydrogens, i.e., have a —ĊH or —ĊH₂ group, can be oxidatively coupled to either acetic acid or propionic acid using manganic acetate or manganic propionate or mixture thereof as the coupling agent to form acetate or propionate esters. It was indeed surprising to find that a carbon atom having three hydrogens (methyl group) would not participate in this coupling reaction, whereas a carbon atom having one or two hydrogens would.

If the alkane has more than one such group, all of them can be coupled to the acid to introduce a multiplicity of acetate or propionic ester groups. By carrying out the reaction using an excess of the alkane with respect to the amount of the manganic salt coupling agent used, only a monoester can be prepared. Furthermore, a carbon atom having only one hydrogen will be coupled to the acid in preference to a carbon atom having two hydrogens.

It is obvious that when a cycloalkane having only —CH₂— groups, e.g., cyclohexane, and certain straight or branched chain alkanes, e.g., propane, n-butane, isobutane, 2,3-dimethylbutane, etc., will produce only one monoester, no matter which

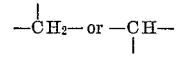

group is coupled to the acid. These esters, even if a mixture, are useful either as solvents or in the perfume industry. They can be used as such or can be separated by usual techniques into their various components if desired.

To minimize side reactions, and also to favor production of monoesters, the reaction is generally carried out in the presence of an excess of both the alkane and the acetic acid or propionic acid. The acid is generally used in solvent proportions since it is an excellent solvent for the alkane, and the manganic salt. Also, we have found that adding all the manganic salt at the beginning is preferable to adding it in small portions as the reaction proceeds.

The reaction is carried out at as low a temperature as the reaction will proceed. However, temperatures up to the reflux temperature of the reaction mixture at atmospheric pressure are generally used unless the particular alkane is a gas at room temperature when the reaction is carried out at the ambient pressure of the reaction mixture at the particular temperature used. Superatomspheric pressure of course can be used if desired, but generally reaction temperatures in excess of 150° C., are not used. Subatmospheric pressure would offer no advantage. Since acetic acid boils at approximately 118° C., and propionic acid boils at approximately 141° C., these generally will control the maximum temperature used unless the particular alkane used has a lower boiling point or pressure is used.

The manganic acetate or propionate is soluble in the reaction mixture and produces a very dark brown color. During the reaction, the manganic salt is converted to the corresponding manganous salt, which is essentially insoluble in the reaction mixture and is white or a light pink. The reaction is therefore, self-indicating as to when it is complete by the change in color of the reaction mixture.

The oxidative coupling reaction involved can be represented by the following equation:

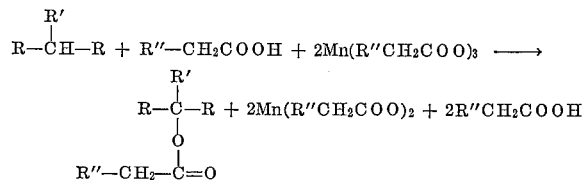

where each R is alkyl, R' is hydrogen or alkyl and R" is hydrogen or methyl.

Insofar as we can determine, the reaction is limited to the preparation of acetate or propionate esters, since higher carboxylic acids, although forming some ester, preferentially are themselves coupled together by the maganic salt as well as participating in other side reactions. These side reactions are also present to some extent with propionic acid so that acetic acid is preferred where highest yields are desired.

As is evident from the equation, two moles of the manganic salt are required to oxidatively couple one mole of the alkane with one mole of carboxylic acid to produce one mole of ester. Although alkanoate salts other than manganic acetate or propionate can be used as the coupling agent, in view of the fact that acetic acid or propionic acid is used in solvent proportions, the manganic salt regardless of what particular manganic alkanoate is added would become predominately the manganic salts of the alkanoic acid used as a solvent. Since manganic acetate and manganic propionate are the most readily available and easiest to prepare, there is no advantage of using other than these particular manganic alkanoates.

Typical of the examples of the alkyl groups, including cycloalkyl groups, which R and R' can be, are methyl, ethyl, propyl, isopropyl, the various butyl isomers, e.g., n-butyl, sec.-butyl, tert.-butyl, the various amyl isomers, the various hexyl isomers including cyclohexyl, the various heptyl isomers, the various octyl isomers, the various decyl isomers, the various heptadecyl isomers, the various octadecyl isomers, the various eicosyl isomers, the various triacontyl isomers, etc. In addition, both R's or both R's and R' can represent a cycloalkane ring, e.g., cyclohexyl, etc.

Typical examples of alkanes which we can oxidatively couple with acetic acid or propionic acid are by way of example, propane, butane, cyclobutane, the various pentane isomers, including cyclopentane, the various hexane isomers, including cyclohexane, the various octane isomers, the various decane isomers, the various octadecane isomers, the various eicosane isomers, the various triacontane isomers, etc., including those alkanes which have a compound cyclic structure, e.g., adamantane, etc. Since the most widely used esters are those of alkanols of lower aliphatic series, the preferred alkanes are those having from three to ten carbon atoms.

In order that those skilled in the art may understand our invention, the following examples are given by way of illustration and not by way of limitation. In all the examples, all parts and percentages are by weight unless otherwise stated and temperatures are in degrees centigrade.

EXAMPLE 1

This example illustrates the preferred method of making the active manganic salt in the form of manganic acetate, used as the coupling agent. A mixture of 500 ml. of acetic acid, 48 g. of manganous acetate tetrahydrate and 85 g. of acetic anhydride (slight excess over that required to react with the water of hydration in the manganous acetate) was heated to reflux for 20 minutes. To this solution, 8 g. of potassium permanganate was slowly added, after which, refluxing was continued for 30 minutes. The reaction mixture was cooled to room temperature and 85 ml. of water added. After standing 16 hours, the manganic acetate dihydrate had crystallized from the solution and was separated by filtration, washed with cold acetic acid and permitted to air dry.

The above procedure produces the most active form of the manganic acetate, useful in practicing our invention. The procedure also can be used to prepare manganic propionate. An analysis shows the salts to be between 90 and 95% pure. In the following examples, adjustments were made based on the analysis of the particular batch, so that the stated amount of manganic salt is that of 100% pure salt.

The general procedure used in the following examples, is to add the alkane to a slurry of the manganic salt in the particular alkanoic acid at reflux until the dark color of the manganic ion has essentially disappeared generally 12–18 hours. After cooling to room temperature, the reaction mixture is poured into a large excess of water and the aqueous solution extracted with ether. After drying of the ether extract and evaporation of the ether, the product is injected into a vapor phase chromatograph and the major product trapped and identified by infrared and mass spectra data.

EXAMPLE 2

Using the general procedure, a solution of 1 ml. of cyclohexane was added to a slurry of 2 g. of manganic acetate dihydrate in 25 ml. of acetic acid. The major product trapped was identified as cyclohexyl acetate.

EXAMPLE 3

Using the general procedure, 3 ml. of cyclooctane was added to a slurry of 5.4 g. of manganic acetate dihydrate in 30 ml. of propionic acid. The major product trapped was identified as cyclooctyl propionate.

EXAMPLE 4

Using the general procedure, 2.7 g. of adamantine was added to a slurry of 2.8 g. of manganic acetate dihydrate in 25 ml. of acetic acid. The main product trapped was identified as 1-adamantyl acetate.

EXAMPLE 5

Using the general procedure, 1.7 g. of 2,3-dimethylbutane was reacted with 25 ml. of acetic acid in the presence of 2.8 g. of manganic acetate dihydrate, to produce as the main product 2,3-dimethyl-2-butyl acetate (2-acetoxy-2,3-dimethylbutane).

When this example was repeated, but using 2,2-dimethylbutane in place of the 2,3-dimethylbutane, the main product was a mixture of two butyl acetates with the major amount being the expected 3,3-dimethyl-2-butyl acetate with the balance being 2,3-dimethyl-2-butyl acetate due to some methyl group migration during either the reaction or work-up. No ester was obtained from 2,2,3,3-tetramethylbutane, a compound having only $CH_3-$ groups.

The esters produced by our process may be used in all those applications which the esters produced by other processes are known to be used. Because of their characteristic pleasant odor, they may be used in the making and blending of perfumes, also they are good solvents or plasticizers for a wide variety of materials and may be used as such. If desired, these esters may also be hydrolyzed to produce the corresponding alcohols which are useful as in organic synthesis.

In light of the above teachings, it is obvious that other modifications and variations of the present invention are possible. As disclosed and claimed in our copending application, Ser. No. 814,157, filed Apr. 7, 1969 as a continuation-in-part of our copending application Ser. No. 742,544, now abandoned, filed concurrently herewith and assigned to the same assignee as the present invention, the anhydride of the acetic or propionic acid used in conjunction with the corresponding acid will greatly reduce the reaction time and increase the yield of ester. It is, therefore, to be understood that changes may be made in the particular embodiment of the invention described which are within the full intended scope of the invention as defined by the appended claims.

What we claim as new and desire to secure by Letters Patent of the United States is:

1. The process of making esters which comprises oxidatively coupling at an elevated temperature (1) an alkane having at least 3 carbon atoms, at least one of said carbon atoms having at least one, but not more than 2 hydrogens, with (2) an acid selected from the group consisting of acetic acid and propionic acid, using (3) an active manganic salt of at least one of the acids of (2), as the oxidative coupling agent.

2. The process of claim 1, wherein the alkane is a non-cyclic alkane.

3. The process of claim 1, wherein the alkane is a cycloalkane.

4. The process of claim 1, wherein the carboxylic acid of (2) is acetic acid.

5. The process of claim 1, wherein the acid of (2) is propionic acid.

6. The process of claim 1, wherein the alkane has no more than 10 carbon atoms and the acid is acetic acid.

7. The process of claim 1, wherein the alkane is a cycloalkane having no more than 10 carbon atoms and the acid is acetic acid.

8. The process of claim 1, wherein the alkane is a non-cyclic alkane having no more than 10 carbon atoms and the acid is acetic acid.

References Cited

UNITED STATES PATENTS 1,864,079   6/1932   Luther et al. _____ 260—488

LORRAINE A. WEINBERGER, Primary Examiner

V. GARNER, Assistant Examiner